United States Patent [19]
Ikeda et al.

[11] Patent Number: 5,121,237
[45] Date of Patent: Jun. 9, 1992

[54] LIQUID CRYSTAL DISPLAY DEVICE AND METHOD OF MANUFACTURE

[75] Inventors: Ayumi Ikeda, Tokyo; Toshihiko Koseki, Yokohama; Toshihiro Ueki, Machida, all of Japan

[73] Assignee: International Business Machines Corporation, Armonk, N.Y.

[21] Appl. No.: 454,221

[22] Filed: Dec. 21, 1989

[30] Foreign Application Priority Data

Dec. 21, 1988 [JP] Japan .................. 63-320565

[51] Int. Cl.$^5$ .................................. G02F 1/133
[52] U.S. Cl. .................................. 359/67; 428/1
[58] Field of Search .............. 350/339 F, 339 R; 359/67; 428/1

[56] References Cited

U.S. PATENT DOCUMENTS

| | | | |
|---|---|---|---|
| 4,591,240 | 5/1986 | Masaki et al. | 350/339 F |
| 4,636,038 | 1/1987 | Kitahara et al. | 350/339 R |
| 4,812,387 | 3/1989 | Suzuki et al. | 350/339 F |
| 4,904,056 | 2/1990 | Castleberry | 350/344 |
| 4,948,706 | 8/1990 | Sugihara et al. | 350/339 F |

FOREIGN PATENT DOCUMENTS

| | | |
|---|---|---|
| 0271313 | 6/1988 | European Pat. Off. . |
| 0107287 | 8/1981 | Japan . |
| 0159520 | 9/1983 | Japan . |
| 0145218 | 6/1987 | Japan . |
| 2153902 | 7/1987 | Japan ............. 350/339 F |
| 0227120 | 10/1987 | Japan . |
| 0253123 | 11/1987 | Japan . |

*Primary Examiner*—Stanley D. Miller
*Assistant Examiner*—Anita Pellman Gross
*Attorney, Agent, or Firm*—Bernard E. Shay; David Aker

[57] ABSTRACT

The present invention relates to a light shield for use in liquid crystal displays. According to the present invention, the light shielding layer includes an acrylic resin with a cross-linked structure in which carbon black particles are dispersed. Further, the light shield may be adapted to cover a switching element which controls the voltage applied to the liquid crystals. In addition, the present invention is directed to a method of manufacturing a light shield which includes an acrylic resin with cross-linked structure in which carbon black particles are dispersed.

17 Claims, 4 Drawing Sheets

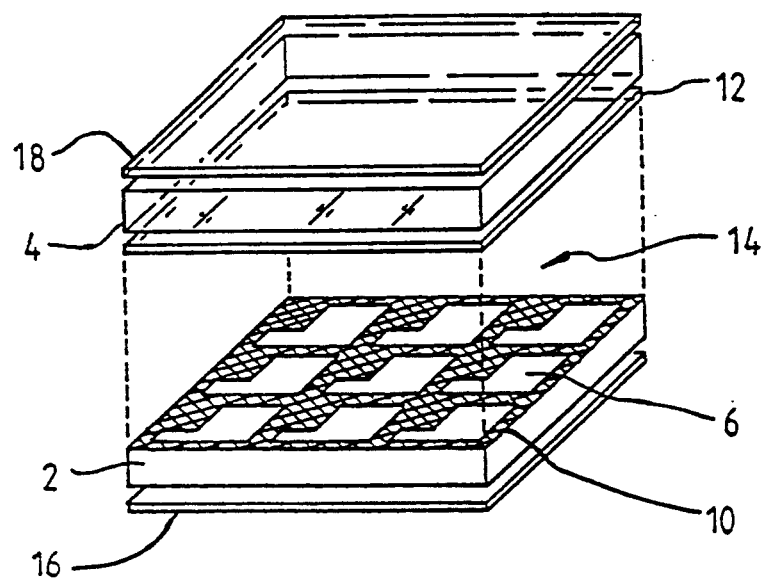
FIG. 1
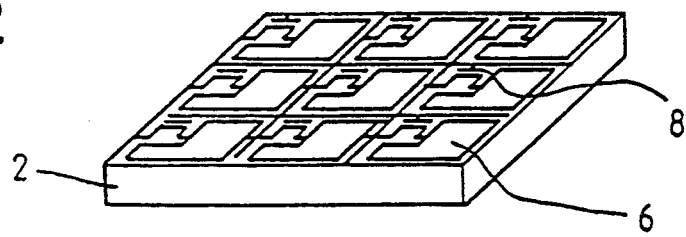
FIG. 2
FIG. 3
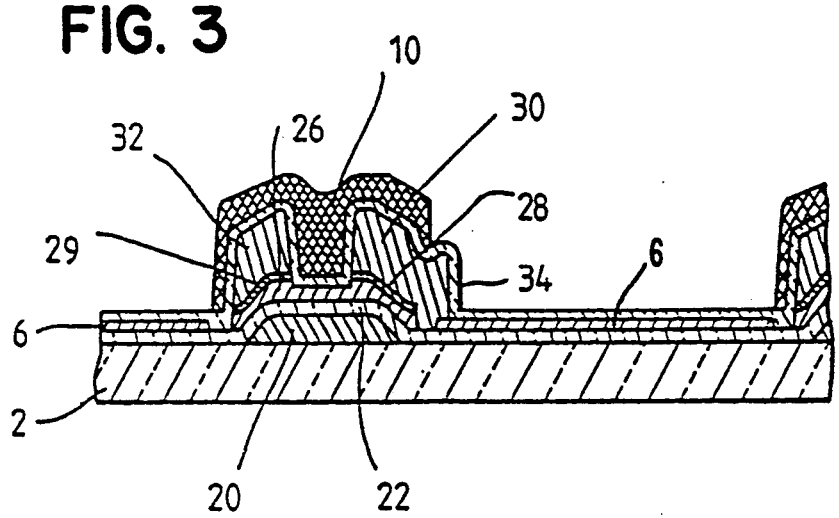

LIQUID CRYSTAL DISPLAY DEVICE AND METHOD OF MANUFACTURE

The present invention relates, in general to a light shielding layer for use in a liquid crystal display and, more particularly, to a light shielding layer including an acrylic resin having a cross-linked structure in which carbon black particles are dispersed.

BACKGROUND OF THE INVENTION

This invention relates to a liquid crystal display device including a light shielding layer. The light shielding layer may be formed between picture element electrodes, or on a switching element such as a thin-film transistor. The invention also relates to a method of manufacturing liquid crystal display devices which include light shielding layers.

Published Unexamined Japanese Patent Application (PUPA) No. 62-145218 describes a display device fabricated by forming a common electrode on a first of two glass substrates, forming picture element electrodes and a thin-film transistor on the second substrate, and forming a light shield on the first glass substrate. The shade layer is designed to shade the gaps between the picture element electrodes and the area of the thin-film transistor on the second electrode. The space between the glass substrates is filled with liquid crystals materials.

Since the display device disclosed in PUPA 62-145218 has the light shielding layer formed on the glass substrate opposite the glass substrate on which the picture element electrodes and the thin-film transistors are formed, highly accurate alignment is required on assembling the two glass substrates. Further, the substrates may become misaligned when they are bonded together due to assembly conditions. In addition, light entering through the picture element electrodes may be reflected by the light shield, hitting the thin film transistors which may result in current leakage.

Published Unexamined Japanese Patent Application (PUPA) No. 62-227120 describes the formation of a light shielding layer. The light shielding layer described has a pattern corresponding to the pattern of the non-display area on a transparent substrate. The transparent substrate has a transparent electrode with a pattern corresponding to the pattern of the display area. In one embodiment, the light shielding layer is formed by screen-printing a pattern on the non-display area with a black ink comprising a thermosetting acrylic resin in which a carbon black pigment is dispersed. In a second embodiment, the light shielding layer is formed by screen-printing the shape of the pattern of non-display area with a polyimide solution in which a carbon black pigment is dispersed.

Since the light shielding layer described in PUPA 62-227120 is printed, it is difficult to accurately locate the light shield. Further, defects resulting from inaccurate printing increase as the display area decreases.

Published Unexamined Japanese Patent Application (PUPA) No. 62-253123 describes the formation of an array of electrodes on a transparent substrate wherein the electrodes consist of a transparent conducting material which is coated with an opaque layer. A light shielding layer is formed by applying a dyeable negative type photoresist evenly to the surface of the transparent substrate which includes the array of electrodes, and exposing the photoresist from the opposite side of the transparent substrate. The exposed photoresist is then developed and removed. Finally, the remaining photoresist is dyed.

Since the light shielding layer disclosed in PUPA 62-253123 is formed by the dyeing method, there are problems resulting from the dye. The dye molecules may enter into and swell the base material on dyeing, which makes the film too thick to realize the optical density required by a light shield (i.e. an O.D. greater than or equal to 2.5). Further, such light shielding layers do not resist high temperatures.

Published Unexamined Japanese Patent Application (PUPA) No. 56-107287 discloses a display device employing a thin film of amorphous silicon as a switching element which drives the liquid crystals. A metal film is used to prevent light from entering into the thin amorphous silicon film.

Since the light shielding layer disclosed in PUPA 56-107287 is formed of a metal, etching is required which may damage picture element electrodes and data wiring.

SUMMARY OF THE INVENTION

In a liquid crystal display device including a plurality of transparent picture element electrodes, formed on a transparent substrate and light shielding layers formed between the picture element electrodes, the light shielding layer comprises an acrylic resin having a cross-linked structure in which carbon black particles are dispersed. This acrylic resin light shielding layer may also be used in a liquid crystal display device including a switching element provided on one of the two substrates, the light shielding layer being formed on the switching element.

In addition, a method for manufacturing a liquid crystal display device is described, wherein the method comprises a series of steps including forming a transparent conducting layer on a transparent substrate, applying a positive photoresist to the conducting layer, exposing the positive photoresist through a mask which prevents light from being transmitted to the element electrode region on the conducting layer, removing the portion of the conducting layer corresponding to the region of the positive photoresist which was exposed to light, removing the positive photoresist, applying a negative photoresist such that it covers the region from which the conducting layer has been removed and the region in which the conducting layer remains, the negative photoresist including an acrylic resin, a photopolymerization initiator, and carbon black, exposing the negative photoresist through a mask which prevents light from being transmitted to the picture element electrode region on the conducting layer, and removing the portion of the negative photoresist which was not exposed to light.

The present invention includes a method of manufacturing a liquid crystal display device which does not require highly accurate alignment of the two transparent substrates and which reduces damage to the picture element electrodes and other electrodes during manufacturing.

The liquid crystal display according to the present invention resists high temperatures, and provides a thin light shielding layer which shields the regions between picture element electrodes from light at high locational accuracy.

The liquid crystal display according to the present invention includes a light shielding layer which reduces optical current leakage by shielding the switching element.

According to the method of the present invention, the liquid crystal display is manufactured using a photomask to form both the picture element electrodes and the light shielding layer.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIG. 1 is a perspective view of an embodiment of a liquid crystal display device according to the present invention.

FIG. 2 is a perspective view, illustrating one of two glass substrates in the liquid crystal display device during the process of fabrication.

FIG. 3 is a cross-sectional view of one of the picture element regions in a liquid crystal display device according to the present invention.

DESCRIPTION OF THE PREFERRED EMBODIMENTS

Figure 4A:
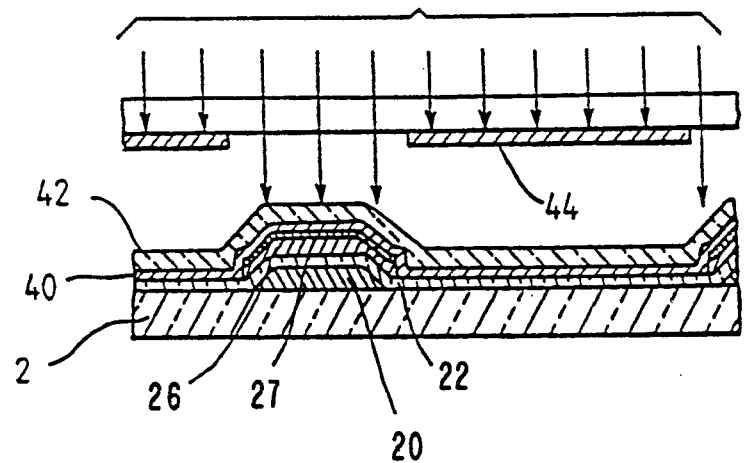
FIGS. 4(a) to 4(j) are cross-sectional views illustrating the steps of an embodiment of a manufacturing process according to the present invention.
Figure 4B:
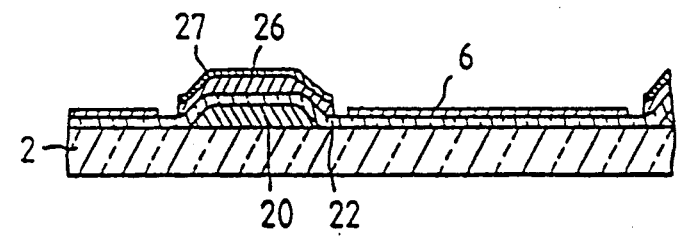

According to one preferred embodiment of the present invention, a light shielding layer is formed comprising an acrylic resin with a cross-linked structure in which carbon black particles are dispersed. The light shielding layer is formed between a plurality of picture element electrodes formed on a transparent substrate.

According to a further embodiment of the present invention, a light shielding layer comprising an acrylic resin with a cross-linked structure in which carbon black particles are dispersed is formed on a switching element which controls voltage applied to liquid crystals filled between two transparent substrates that face each other.

According to a further embodiment of the present invention, a method of manufacturing liquid crystal displays is described, including, at least, the following steps:

(a) a transparent conducting layer is formed on a transparent substrate;

(b) a positive photoresist is applied to the conducting layer;

(c) the positive photoresist is exposed to light using a mask which prevents light from being transmitted to the picture element electrode region of the conducting layer;

(d) removing the positive photoresist and the portion of the conducting layer underlying the portion of the positive photoresist exposed to light;

(e) applying a negative photoresist containing an acrylic resin, a photopolymerization initiator and carbon black to the surface, including the portion from which the conducting layer has been removed, and the remaining conducting layer;

(f) exposing the negative photoresist to light, using a mask to prevent light from being transmitted to the picture element electrode region of the conductor layer (this may be the same mask used in step c); and (g) removing the portion of the negative photoresist which has not been exposed to light.

In order to manufacture an active matrix liquid crystal display device having a switching element, such as a thin film transistor, which controls the voltage applied to liquid crystals, a switching element is formed on a portion of the area from which the conducting layer has been removed after step (d) and the negative photoresist is applied to the switching element in step (e).

FIG. 1 illustrates an embodiment of a liquid crystal display device according to the present invention. Two glass substrates 2 and 4 are provided facing each other with a certain distance between them. Inside glass substrate 2 (i.e., the side facing the glass substrate 4) are transparent picture element electrodes 6 consisting of, for example, indium tin oxide (hereafter called ITO) and thin-film transistors 8 (hereafter called TFTs) which control the voltage applied to the liquid crystals.

A light shielding layer 10, for example, including an acrylic resin with a cross-linked structure in which carbon black particles are dispersed, is formed between picture element electrodes 6 and on TFTs 8 on glass substrate 2. A transparent common electrode 12 consisting of, for example, ITO is formed inside glass substrate 4 (i.e., the side facing glass substrate 2). Twisted nematic (TN) type liquid crystals 14 fill the space between picture element electrodes 6 and common electrode 12. Outside glass substrates 2 and 4 are polarizing plates 16 and 18, respectively.

If the liquid crystal display device shown in FIG. 1 is a "normally-black" type display device, liquid crystals in the picture element region transmit white light when TFT 8 is on. If the liquid crystal display device is a "normally-white" type display device, liquid crystals in the picture element region transmit white light when TFT 8 is off. Since light shielding layer 10 prevents light from passing between picture element electrodes 6 and also prevents light reflected by the glass substrate 4 from entering TFT 8, clear images are displayed and no current leakage occurs through TFT 8. Since light shielding layer 10 is formed on the picture element electrode (6) side, (unlike the device described in PUPA 62-145218, where a light shielding layer is formed on the common electrode (12) side), the difficulty of alignment of the region between the picture elements with the light shielding layer is reduced.

Light shielding layer 10 may include an acrylic resin with cross-linked structure in which carbon black particles are dispersed. The acrylic resin, having a cross-linked structure, is produced by exposing, developing and etching a negative photoresist containing an acrylic resin and a photopolymerization initiator. Therefore, light shielding layer 10 is easy to process precisely and is suitable for liquid crystal display devices with large, high-resolution screens. Also, since carbon black is dispersed in the resin as a coloring material, the difficulty of orientation processing due to a light shielding layer, which occurs in the dyeing method, is eliminated.

FIG. 3 shows a cross-sectional view of one picture element region in the liquid crystal display device shown in FIG. 1. A gate electrode 20 of the TFT, consisting of, for example, tantalum (Ta), is formed on glass substrate 2. A TFT gate insulation layer 22, consisting of, for example, $SiO_2$, is formed on gate electrode 20 and glass substrate 2. A semiconductor layer 26 (preferably i-type) consisting of, for example, a-Si, is formed on the TFT channel region of the gate insulation layer 22, and semiconductor layers 28 and 29 (preferably n+ type), each consisting of, for example, a-Si, are formed in the source and drain regions on semiconductor layer 26 of TFT 8.

A picture element electrode 6, consisting of, for example, ITO is formed on insulation layer 22 in the region outside the TFT region and within the picture element region. Source electrode 30 and drain electrode 32, consisting of, for example, a double structure of molybdenum (Mo) and aluminum (Al) are formed on semiconductor layers 28 and 29 (preferably n+ type) of, for example, a-Si. Passivation layer 34, consisting of, for example, $SiN_x$, is formed on source electrode 30, drain electrode 32, and picture element electrode 6. A light shielding layer 10, comprising, for example, a negative photoresist containing a black pigment consisting of carbon black, is formed on the area of passivation layer 34 outside the region which includes picture element electrode 6. Light shielding layer 10 prevents light from entering into semiconductor layer 26 which is the channel of the TFT, and from passing through the region between picture element electrodes 6.

FIGS. 4(a)-(j) illustrate fabrication steps for an embodiment of a process for producing a liquid crystal display device shown in FIG. 1 and FIG. 3. Referring first to FIG. 4(a), gate electrode 20, consisting of, for example, tantalum, is formed on glass substrate 2; gate insulation layer 22, consisting of, for example, $SiO_2$, is formed on gate electrode 20 and glass substrate 2; a semiconductor (preferably an i-type) layer 26, consisting of, for example, a-Si, and a semiconductor layer 27 (preferably, n+ type) consisting of, for example, a-Si, are sequentially laminated in a TFT channel region on gate insulation layer 22; layer 40 of, for example, ITO, is deposited on semiconductor layer 27, and the insulation layer 22 by, for example, sputtering; and a positive photoresist 42 for patterning layer 40 is applied to the top surface of layer 40.

To form picture element electrodes by patterning layer 40, positive photoresist 42 is irradiated with, for example, ultraviolet rays using a mask 44 to shade the picture element electrode region. Positive photoresist 42 is then developed with a developer solution, and ITO layer 40 is wet-etched. By removing the remaining positive photoresist from ITO layer 40 with, for example, an alkaline lift-off agent, picture element electrode 6 is formed (FIG. 4(b)). Since ITO does not resist acids but resists alkalis, no damage will occur if a positive photoresist, for which an alkaline lift-off agent is usable, is used for patterning.

Figure 4C:
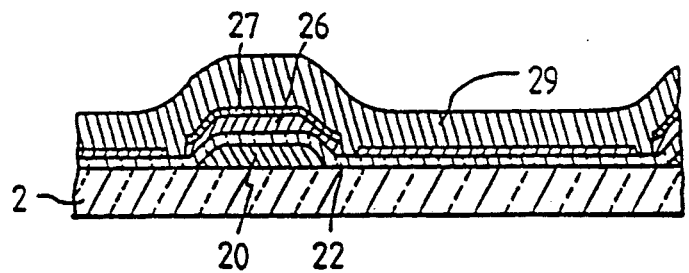
Figure 4D:
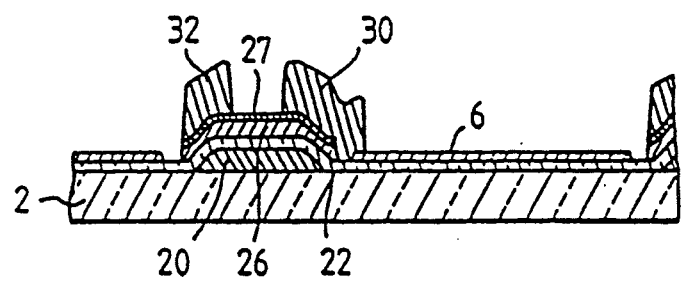

Next, as shown in FIG. 4(c), a double layer 29, consisting of, for example, a Mo layer and an Al layer, is deposited by, for example, sputtering. A positive photoresist is then applied to the double layer 29, exposed using a mask to shade the photoresist so that source and drain electrodes, data and address lines, and an electrode pad are formed and developed. The double layer 29 is etched to form source electrode 30 and drain electrode 32 as shown in FIG. 4(d), as well as data and address lines and an electrode pad (not shown).

Figure 4E:
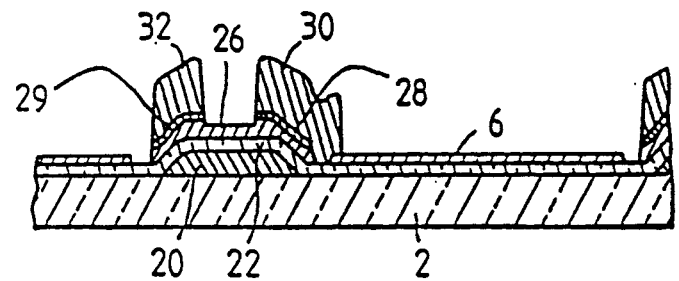
Figure 4F:
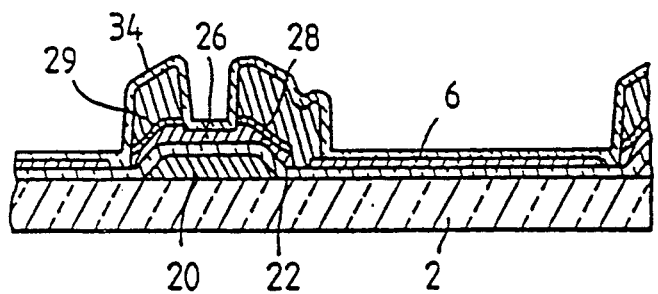
Figure 4G:
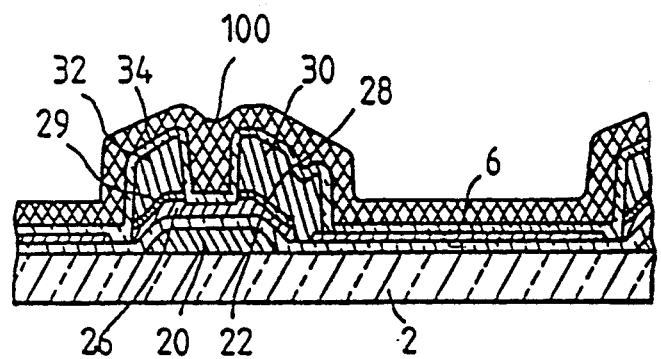
Figure 4H:
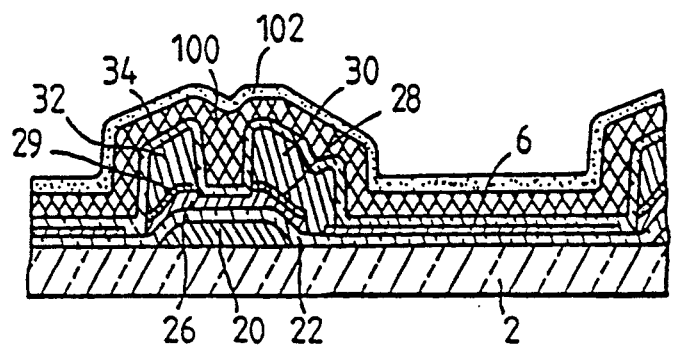

Semiconductor layer 27 (preferably n+ type) of, for example, a-Si, in the TFT channel between source electrode 30 and drain electrode 32 is removed by chemical dry etching using electrodes 30 and 32 as masks (FIG. 4(e)). A layer of, for example, $SiN_x$, is then deposited by sputtering for the formation of a passivation layer, patterned using a positive photoresist, and etched to form passivation layer 34 as shown in FIG. 4(f).

A black negative photoresist 100, prepared by, for example adding a photopolymerization initiator and a black pigment consisting of carbon black to an acrylic resin consisting of oligoester diacrylate synthesized from maleic anhydride and polyethylene glycol, and diluted with a solvent consisting of ethyl cellosolve (2-ethoxy ethanol), is applied to the surface of the passivation layer 34 using, for example, a spin coater to a thickness of about 1.0 to about 2.5 micrometers resulting in an optical density (O.D.) of not lower than approximately 2.5. The photoresist 100 is then prebaked to evaporate the solvent (FIG. 4(g)).

In photopolymerization, the photopolymerization initiator promotes the cross-linkage of the resin in the form of radicals. If oxygen is present, however, the radicals are consumed and cross linkage reaction does not take place. Therefore, an oxygen barrier layer 102, consisting of, for example, water soluble polyvinyl alcohol which has a high transmissivity and therefore does not affect ultraviolet irradiation and does not dissolve the black negative photoresist 100, is applied to the surface of the black negative photoresist 100 (FIG. 4(h)).

Figure 4I:
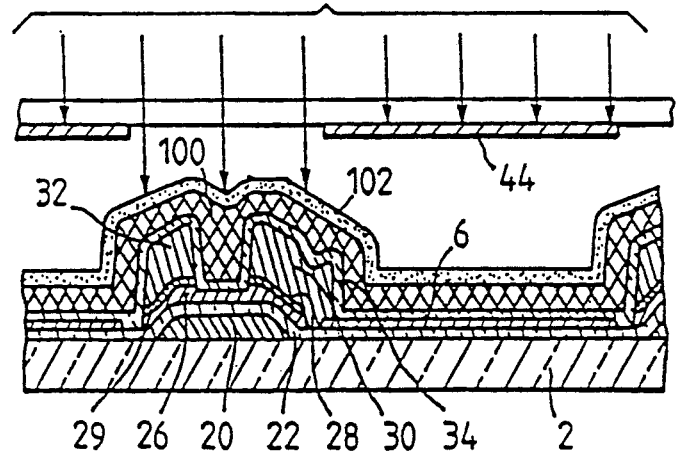
Figure 4J:
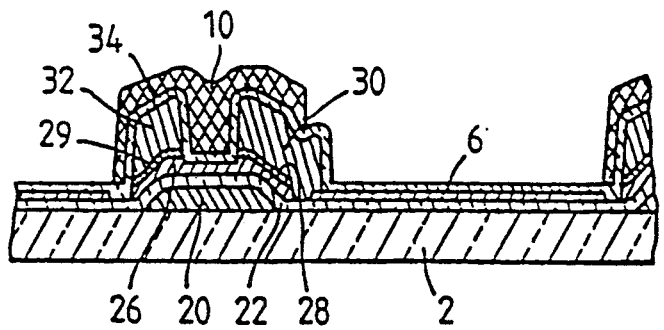

The black negative photoresist 100 is then exposed to ultraviolet rays using a mask 44 which may be identical to the mask used for the formation of the picture element electrode 6, as shown in FIG. 4(i). Since the black negative photoresist 100 is of a negative type, only the area exposed to ultraviolet rays remains after an etchant is applied. The remaining black negative photoresist 100 is developed with a surface active agent and post-baked to form a light shielding layer 10 as shown in FIG. 4(j).

Since the acrylic resin used in the black negative photoresist 100 is suitable for precision processing and has high transparency and pigment dispersing ability, it is suitable for use in forming a delicate light shielding layer. Also, since a weak alkaline surface active agent or water can be used as a developer for the acrylic resin, the picture element electrode 6 (which is normally made of ITO), the source electrode 30 and the drain electrode 32 will not be damaged.

Since the black photoresist 100 may consist of a photoresist in which carbon black pigment is dispersed, the light shielding layer is not so thick as to make the orientation of liquid crystals difficult, which occurs in a light shielding layer prepared by the dyeing method. Further black photoresist 100 resists annealing which may be performed at about 250 degrees centigrade to recover TFT properties.

Although oligoester diacrylate prepared from maleic anhydride and polyethylene glycol is used in the above embodiment as the acrylic resin, acrylic resins according to this invention are not limited to this, but the following acrylic resins can be used:

(1) Acrylic ester of polyhydric alcohols such as
  ethylene glycol diacrylate,
  diethylene glycol diacrylate,
  triethylene glycol diacrylate,
  polyethylene glycol diacrylate, and
  1,4-butane diol diacrylate
(2) Polyester polyacrylates such as
  diacrylate of phthalic anhydride and diethylene glycol, and
  oligoesterdiacrylate of phthalic anhydride and polyethylene glycol
(3) Urethane acrylates such as
  di (methacryloxyethyl)-4-methyl-m-phenylene diurethane Urethane acrylates have the advantage that no oxygen barrier layer is required.

As a developer for acrylic resin-based black negative photoresist, water can be used in place of a surface active agent.

Although a light shielding layer is formed on the TFT in the above embodiment, this invention can be applied, not only to TFT, but also to any switching element formed on a transparent substrate to control voltage supplied to liquid crystals such as MIM (metal-insulator-metal).

Since the light shielding layer according to this invention may comprise an acrylic resin having a cross-linked structure in which carbon black particles are dispersed, which can be processed easily, the light shielding layer is suitable for liquid crystal display devices with a large screen and high resolution. Further, the light shielding layer is not thick and resists high temperature. In fabricating such a light shielding layer, damage to picture element electrodes and other electrodes is reduced. If a positive photoresist is used to form picture element electrodes, the mask for the formation of picture element electrodes can be used for the formation of the light shielding layer.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What I claim is:

1. In a liquid crystal display device having a plurality of transparent picture element electrodes formed on a transparent substrate and light shielding layers formed between said picture element electrodes, the improvement comprising:
   said light shielding layers including an acrylic resin having a cross-linked structure in which carbon black particles are dispersed to render said resin substantially light blocking,
   said acrylic resin comprising an oligoester diacrylate prepared for maleic anhydride and polyethylene glycol.

2. In a liquid crystal display device having a plurality of transparent picture element electrodes formed on a transparent substrate and light shielding layers formed between said picture element electrodes, the improvement comprising:
   said light shielding layers including an acrylic resin having a cross-linked structure in which carbon black particles are dispersed to render said resin substatially light blocking,
   said acrylic resin being an acrylic ester of polyhydric alcohols selected from the group consisting of: ethylene glycol diacrylate, diethylene glycol diacrylate, triethylene glycol diacrylate, polyethylene glycol diacrylate, and 1, 4 butane diol diacrylate.

3. In a liquid crystal display device having a plurality of transparent picture element electrodes formed on a transparent substrate and light shielding layers formed between said picture element electrodes, the improvement comprising:
   said light shielding layers including an acrylic resin having a cross-linked structure in which carbon black particles are dispersed to render said resin substantially light blocking,
   said acrylic resin being a polyester polyacrylate selected from the group consisting of: diacrylate of phthalic anhydride and diethylene glycol, and oligoesterdiacrylate of phthalic anhydride and polyethylene glycol.

4. In a liquid crystal display device having a plurality of transparent picture element electrodes formed on a transparent substrate and light shielding layers formed between said picture element electrodes, the improvement comprising:
   said light shielding layers including an acrylic resin having a cross-linked structure in which carbon black particles are dispersed to render said resin substantially light blocking,
   said acrylic resin being a urethane acrylate comprising: di(methacryloxyethyl)-4-methyl-m-phenylene diurethane.

5. In a liquid crystal display device having liquid crystals filled between two transparent substrates facing each other, a switching element for controlling voltage supplied to said liquid crystals provided on one of saidtwo substrates, and a light shielding layer formed on said switching element,
   said light shielding layer including an acrylic resin having a cross-linked structure in which carbon black particles are dispersed,
   said acrylic resin comprising an oligoester diacrylate prepared from maleic anhydride and polyethylene glycol.

6. In a liquid crystal display device having liquid crystals filled between two transparent substrates facing each other, a switching element for controlling voltage supplied to said liquid crystals provided on one of said two substrates, and a light shielding layer formed on said switching element,
   said light shielding layer including an acrylic resin having a cross-linked structure in which carbon black particles are dispersed,
   said acrylic resin being an acrylic ester of polyhydric alcohols selected from the group consisting of: ethylene glycol diacrylate, diethylene glycol diacrylate, triethylene glycol diacrylate, and 1, 4 butane diol diacrylate.

7. In a liquid crystal display device having liquid crystals filled between two transparent substrates facing each other, a switching element for controlling voltage supplied to said liquid crystals provided on one of said two substrates, and a light shielding layer formed on said switching element,
   said light shielding layer including an acrylic resin having a cross-linked structure in which carbon black particles are dispersed,
   said acrylic resin being a polyester polyacrylate selected from the group consisting of: diacrylate of phthalic anhydride and diethylene glycol, and oligoesterdiacrylate of phthalic anhydride and polyethylene glycol.

8. In a liquid crystal display device having liquid crystals filled between two transparent substrates facing each other, a switching element for controlling voltage supplied to said liquid crystals provided on one of said two substrates, and a light shielding layer formed on said switching element,
   said light shielding layer including an acrylic resin having a cross-linked structure in which carbon black particles are dispersed, said acrylic resin being a urethane acrylate comprising: di(methacryloxyethyl)-4-methyl-m-phenylene diurethane.

9. A light shield comprising:
an acrylic resin having a cross-linked structure; and
carbon black particles dispersed in said resin to render said resin substantially light blocking,
said acrylic resin comprising an oligoester diacrylate prepared from maleic anhydride and polyethylene glycol.

10. A light shield comprising:
an acrylic resin having a cross-linked structure; and
carbon black particles dispersed in said resin to render said resin substantially light blocking,
said acrylic resin being an acrylic ester of polyhydric alcohols selected from the group consisting of: ethylene glycol diacrylate, diethylene glycol diacrylate, triethylene glycol diacrylate, polyethylene glycol diacrylate, and 1, 4-butane diol diacrylate.

11. A light shield comprising:
an acrylic resin having a cross-linked structure; and
carbon black particles disposed in said resin to render said resin substantially light blocking,
said acrylic resin being a polyester polyacrylate selected from the group consisting of diacrylate of phthalic anhydride and diethylene glycol, and oligoesterdiacrylate of phthalic anhydride and polyethylene glycol.

12. A light shield comprising:
an acrylic resin having a cross-linked structure; and
carbon black particles disposed in said resin to render said resin substantially light blocking,
said acrylic resin being a urethane acrylate comprising:
di(methacryloxyethyl)-4-methyl-m-phenylene diurethane.

13. A method of manufacturing a liquid crystal display device, said method comprising the steps of:
forming a transparent conducting layer on a transparent substrate;
applying a positive photoresist to said conducting layer;
exposing said positive photoresist through a mask which prevents light from being transmitted to a picture element electrode region of said conducting layer;
removing a part of said conducting layer corresponding to a region of said positive photoresist having been exposed to light, and removing positive photoresist;
applying a negative photoresist containing an acrylic resin, a photopolymerization initiator, and carbon black to the region from which the conducting layer has been removed, and to a remainder of said conducting layer;
exposing said negative photoresist through a mask which prevents light from being transmitted to the picture element electrode region of said conducting layer; and
removing that portion of said negative photoresist that was not exposed to light.

14. A method according to claim 13, wherein said negative photoresist is substantially opaque, said acrylic resin has a crosslinked structure and said carbon black renders said resin substanitally light blocking.

15. A method of manufacturing a light shield on the surface of a substrate including a conducting layer which substantially covers said substrate, said method comprising the steps of:
depositing a positive photoresist layer over said conducting layer;
exposing said positive photoresist layer through a mask wherein said mask includes substantially opaaque regions arranged to define picture element electrode regions in said conducting layer, said mask further including substantially transparent regions;
removing said positive photoresist layer overlaying said conducting layer outside said picture element electrode regions;
removing a portion of said conducting layer outside said picture element electrode regions;
removing said positive photoresist over said picture element electrode regions;
depositing a substantially opaque negative photoresist layers over said picture element electrodes;
exposing said negative photoresist layer through said mask such so that a portion of said negative photoresist is not exposed;
removing said unexposed portion of said negative photoresist.

16. A method according to claim 15, wherein said substantially opaque negative photoresist comprises
an acrylic resin having a cross-linked structure; and
carbon black particles disposed in said resin to render said resin substantially light blocking.

17. A method according to claim 15, wherein a single mask is used to expose both said negative photoresist and said positive photoresist.

* * * * *